(12) United States Patent
Grubbs

(10) Patent No.: US 6,755,457 B2
(45) Date of Patent: Jun. 29, 2004

(54) VEHICLE CONVERTIBLE ROOF

(75) Inventor: Todd A. Grubbs, Adrian, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/237,767

(22) Filed: Sep. 9, 2002

(65) Prior Publication Data

US 2004/0046414 A1 Mar. 11, 2004

(51) Int. Cl.[7] .................................................. B60J 7/08
(52) U.S. Cl. .................. 296/107.09; 296/116; 296/121
(58) Field of Search ....................... 296/107.09, 107.16, 296/107.01, 108, 129, 114, 115, 121, 122, 116

(56) References Cited

U.S. PATENT DOCUMENTS

| | | | |
|---|---|---|---|
| 223,900 | A | | 1/1880 Fockler |
| 1,697,172 | A | | 1/1929 Evans |
| 2,066,231 | A | | 12/1936 Salmons et al. |
| 2,365,765 | A | | 12/1944 Keller |
| 2,560,496 | A | | 7/1951 Vigmostad |
| 2,833,593 | A | * | 5/1958 Olivier et al. ......... 296/107.01 |
| 3,271,067 | A | | 9/1966 Rollman |
| 5,207,474 | A | | 5/1993 Licher et al. |
| 5,746,470 | A | | 5/1998 Seel et al. |
| 5,785,375 | A | | 7/1998 Alexander et al. |
| 5,829,821 | A | | 11/1998 Aydt et al. |
| 5,971,470 | A | * | 10/1999 May et al. ............. 296/107.09 |
| 6,039,383 | A | | 3/2000 Jambor et al. |
| 6,131,988 | A | | 10/2000 Queveau et al. |
| 6,139,087 | A | * | 10/2000 Wolfmaier et al. ..... 296/107.16 |
| 6,209,945 | B1 | | 4/2001 Aydt et al. |
| 6,270,143 | B1 | * | 8/2001 Heselhaus et al. ...... 296/107.01 |
| 6,293,605 | B2 | | 9/2001 Neubrand |
| 6,343,829 | B2 | * | 2/2002 Busch .................... 296/107.15 |
| 6,364,395 | B1 | * | 4/2002 Halbweiss et al. ...... 296/107.09 |
| 6,390,530 | B1 | * | 5/2002 Maass .................... 296/107.09 |
| 6,439,643 | B2 | * | 8/2002 Barker ........................ 296/116 |
| 6,478,362 | B2 | * | 11/2002 Obendiek ................... 296/108 |
| 6,499,792 | B2 | * | 12/2002 MacFarland ........... 296/107.09 |
| 6,572,175 | B2 | * | 6/2003 Schutt et al. ............... 296/108 |
| 2001/0017475 | A1 | | 8/2001 Busch |

FOREIGN PATENT DOCUMENTS

| | | |
|---|---|---|
| FR | 635838 | 3/1928 |
| FR | 651986 | 3/1929 |
| FR | 817693 | 9/1937 |
| GB | 8268 | 3/1914 |
| SU | 369039 | 8/1973 |

* cited by examiner

Primary Examiner—Joseph D. Pape
Assistant Examiner—G. Blankenship
(74) Attorney, Agent, or Firm—Harness, Dickey & Pierce, P.L.C.

(57) ABSTRACT

A convertible roof is provided which includes a folding mechanism that couples a pair of adjacent roof rails together with at least two links to form a linkage assembly with at least four-bars without the adjacent pair of roof rails being directly connected to one another. A convertible roof having a folding mechanism that controls retraction of the convertible roof so that a portion of the convertible roof serves as a cover that conceals a portion of the convertible roof within the stowage compartment is also provided.

34 Claims, 7 Drawing Sheets

VEHICLE CONVERTIBLE ROOF

BACKGROUND AND SUMMARY OF THE INVENTION

This invention relates generally to roofs for automotive vehicles and, more particularly, to a convertible roof for an automotive vehicle.

Traditional soft-top convertible roofs for automotive vehicles typically employ four or five roof bows, most of which have an inverted U-shape spanning transversely across the vehicle for supporting a vinyl, canvas or polyester fabric, pliable roof cover. A number one roof bow is mounted to a pair of front roof rails and is typically latched to a stationary front header panel of the automotive vehicle body disposed above the front windshield. A number two roof bow is typically mounted to a pair of center roof rails which are pivotably connected to the front roof rails. Furthermore, the number three, four and any additional optional roof bows are commonly mounted to a pair of rear roof rails which are pivotably coupled to the center roof rails. The roof cover can also have a hard or rigid portion along with the pliable portion. For example, reference should be made to U.S. Pat. No. 5,429,409 entitled "Convertible Top", which is incorporated by reference herein.

Most traditional convertible roofs are stowed in a boot well or stowage compartment that is located aft of a passenger compartment in the vehicle. A boot or tonneau cover is then used to cover the boot well and conceal the convertible roof from view and/or protect the stowed roof from the environment. The use of a boot cover or tonneau cover increases the cost and complexity of a vehicle with a convertible roof. Additionally, the separate boot cover also increases the number of operating parts and material required to conceal the stowed convertible roof from view and/or protect it from the environment. Therefore, it would be desirable if the boot cover could be integrated into the convertible roof such that a portion of the convertible roof also functions as the boot cover when the convertible roof is in its stowed position.

Traditional soft-top convertible roofs can present a packaging (stowing) difficulty; that is, designing the convertible roof to reside in a minimal space in the stowage compartment when stowed. The difficulty is more pronounced when the folding roof is used on a larger vehicle (for example, a vehicle having front and rear seating areas). The packing of the roof rails is important to minimize the required stowage space. Therefore, it would also be desirable to provide a linkage assembly between the roof rails that allow for compact packaging of the convertible roof.

In accordance with the present invention, a unique and novel convertible roof is provided which includes a folding mechanism that couples a pair of adjacent roof rails together with at least two links to form a linkage assembly with at least four-bars without the adjacent pair of roof rails being directly connected to one another. The linkage assemblies control motion of the pair of roof rails relative to each other when the mechanism moves between raised and stowed positions. In another aspect of the present invention, a unique and novel way to control the folding of the convertible roof is employed such that a portion of the convertible roof serves as a cover that conceals a portion of the convertible roof within the stowage compartment. In yet another aspect of the present invention, a unique and novel convertible roof is provided which includes a folding mechanism that includes three roof rails coupled together by two linkage assemblies of at least four-bars each which in turn are coupled together by another linkage assembly of at least four-bars.

Along with providing a unique linkage assembly between first and second pairs of roof rails, controlling the top so that a portion serves as a cover, and providing a unique linkage assembly between three pairs of roof rails, additional objects, advantages and features of the present invention will become apparent from the following description and appended claims, taken in conjunction with the accompanying drawings. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1A:
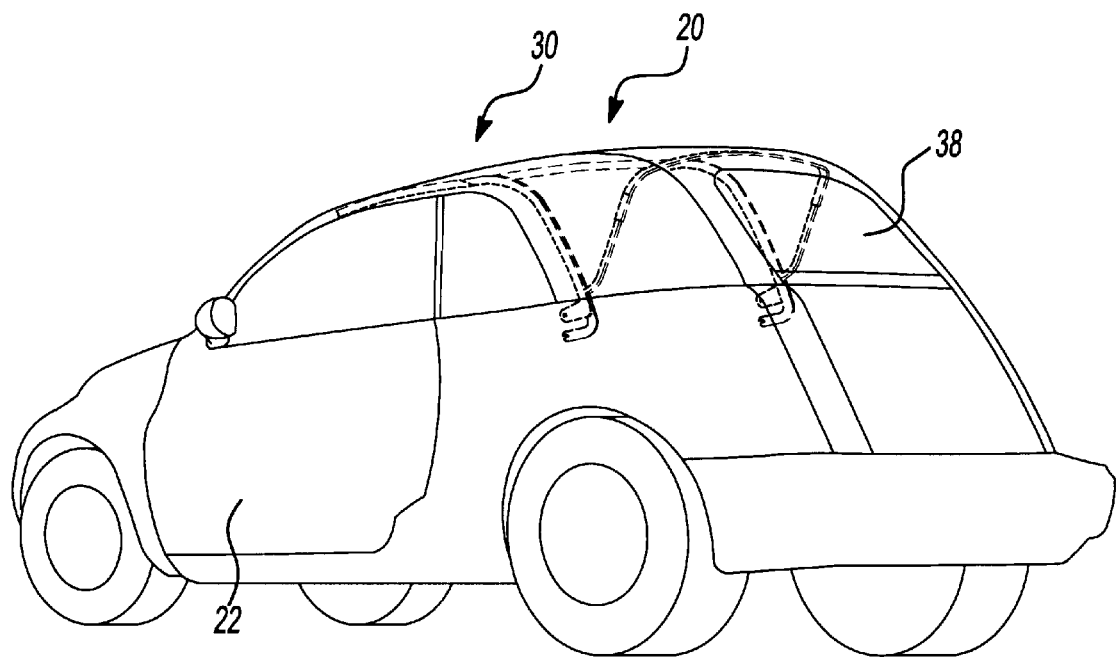
FIG. 1A is a perspective view showing the preferred embodiment of a vehicle with a convertible roof in a raised operative position in accordance with the principles of the present invention.
Figure 1B:
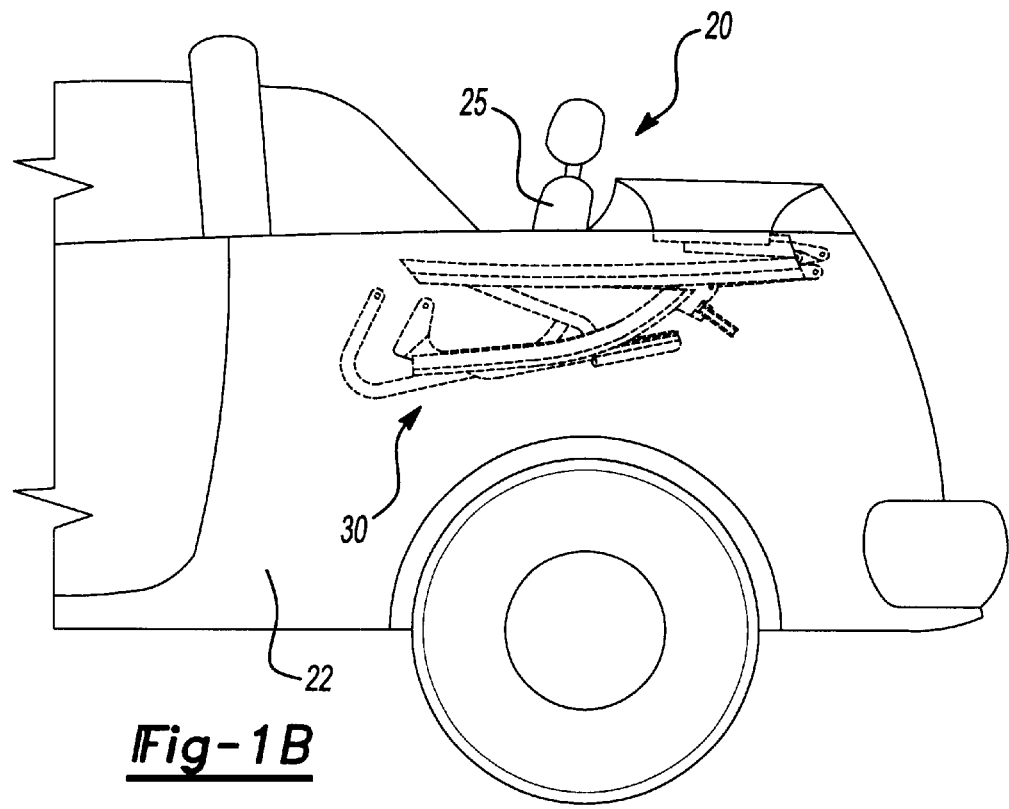
FIG. 1B is a side elevation view of the vehicle of FIG. 1A with the convertible roof in a stowed position in accordance with the principles of the present invention.
Figure 1C:
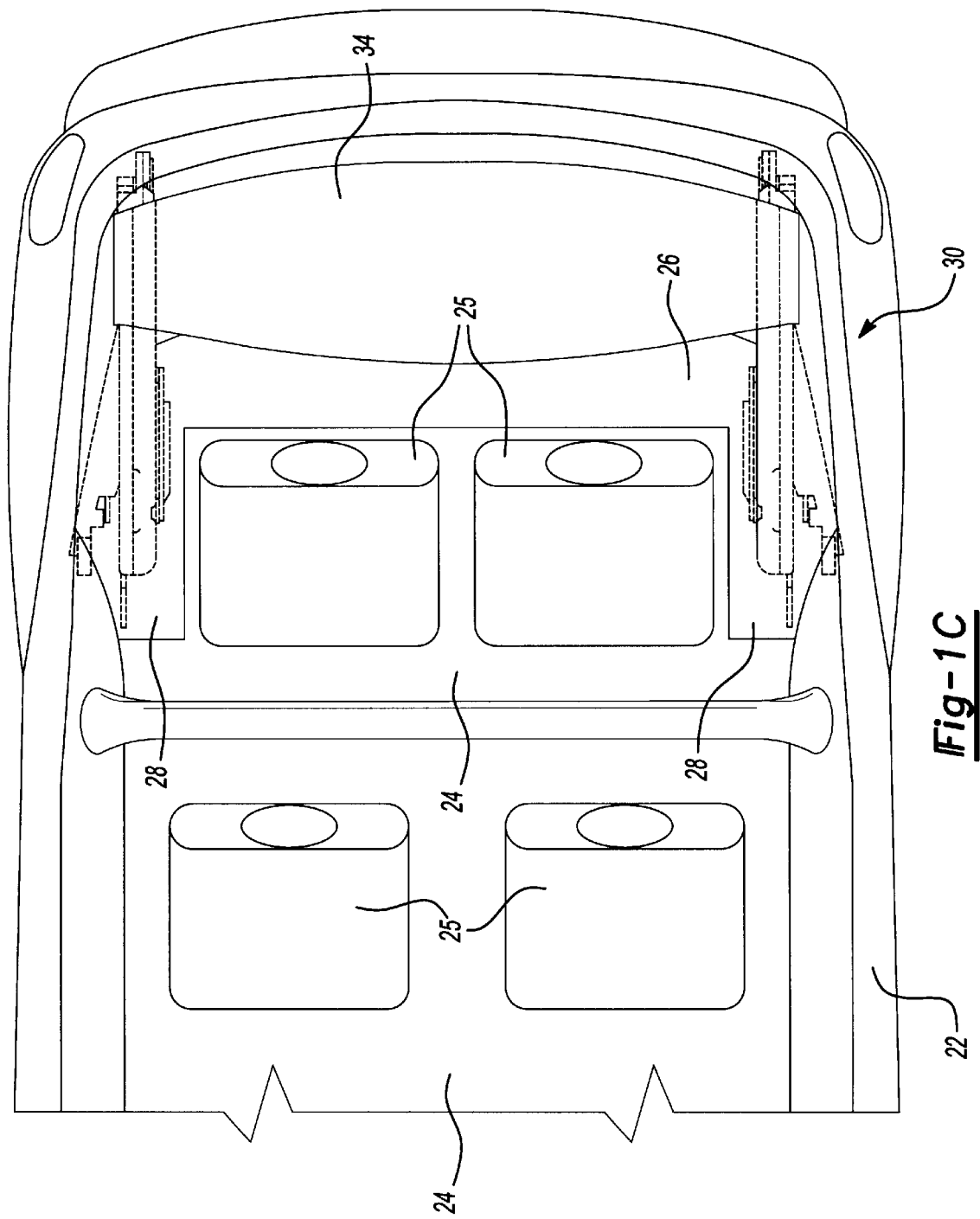
FIG. 1C is an overhead view of the vehicle in FIG. 1B.

FIGS. 1A–C show the preferred embodiment of a convertible roof 20 according to the principles of the present invention. In this embodiment, convertible roof 20 is a reverse tri-fold convertible roof and is employed on an automotive vehicle 22 having a passenger compartment 24 with passenger seats 25 and a generally U-shaped (as viewed from above) boot well or stowage compartment 26. As can be seen, passenger compartment 24 has two rows of passenger seats 25—a first row and a second row aft of the first row. Passenger seats 25 can be arranged in a variety of configurations. As shown, passenger seats 25 are each forward facing with the passenger seats 25 in each row being arranged in a side-by-side configuration. It should be understood, however, that other configurations and arrangements of passenger seats 25 can be employed without departing from the scope of the present invention as defined by the claims. Stowage compartment 26 is positioned aft of passenger compartment 24 with quarter trim portions 28 extending along a portion of sides of passenger compartment 24. Convertible roof 20 is of the type utilizing a folding or top stack mechanism 30 that partially supports a roof cover 32 and is operable between a fully raised position, as shown in FIG. 1A, and a fully stowed position, as shown in FIGS. 1B and 1C. Roof cover 32 includes a hard or rigid portion 34, a pliable or soft portion 36, and a backwindow, known as a backlite, 38. Soft portion 36 is made from a pliable material, such as vinyl, canvas, or a polyester fabric. If desired, hard portion 34 can be covered by the same material that comprises soft portion 36 to give a uniform appearance. Backlite 38 is attached to roof cover 32 and is not pivotally coupled to folding mechanism 30. For example, reference should be made to U.S. Pat. No. 5,887,936 titled Backlite System For Use In An Automotive Vehicle Convertible Roof, by Cowsert, and U.S. Pat. No. 6,102,467 titled Backlite Retention System For Use In An Automotive Vehicle Convertible Roof, by Laurain et al., both of which are herein incorporated by reference. Backlite 38 can be made of either a rigid material, such as glass, as shown, or a pliable transparent vinyl material (not shown).

Referring to FIGS. 2A–C and 3, convertible roof 20 and folding mechanism 30 are shown symmetrical about a longitudinal, fore-and-aft centerline (not shown) of vehicle 22. Folding mechanism 30 includes right and left roof linkages on the respective right and left sides of vehicle 22. For brevity, only the left side of folding mechanism 28 is shown (except for FIG. 3) and discussed, however, it should be understood that right side linkages are also provided as part of folding mechanism 28 and are mirrored images of the left side. Also, when using the terms "fore" and "aft", "front" and "back", "forwardly" and "rearwardly" in describing components of folding mechanism 30, such reference refers to the orientation of the components when folding mechanism 30 is in the fully raised position.

Folding mechanism 30 includes a first roof bow 40 that extends transversely across vehicle 22 and has a front edge 42 that is latched to a stationary front header panel of vehicle 22 disposed above the front windshield when in the fully raised position, as shown in FIG. 1A. First roof bow 40 is fixedly connected to a front roof rail 44. Alternatively, the first roof bow 40 can be formed integrally with front roof rail 44. For example, first roof bow 40 and front roof rail 44 can be integrally cast from aluminum or a magnesium alloy. Front roof rail 44 is pivotally coupled to a center roof rail 46 by a first multi-link hinge assembly (MHA) 48. The first MHA 48 controls the rotation of front roof rail 44 relative to center roof rail 46.

First MHA 48 includes a pivot connection 50 between a back end portion of front roof rail 44 and a front end portion of center roof rail 46. One end of a first link 52 is pivotally connected to an integral extension of the back end portion of front roof rail 44 at pivot 54 while an opposite end is pivotally connected to an intermediate or middle portion of a second link 56 at pivot 58. An end of second link 56 is pivotally connected to an intermediate or middle portion of center roof rail 46 at pivot 60. Thus, first MHA 48 is a four-bar linkage assembly that includes front roof rail 44, first link 52, second link 56, and center roof rail 46 and is defined by pivots 54, 58, 60, and 50. Movement of first MHA 48 is controlled by a first control link 62 which is pivotally coupled to first MHA 48. As can be seen, a front end portion of first control link 62 is pivotally connected to an end of second link 56 opposite pivot 60 at pivot 64.

Center roof rail 46 is pivotally coupled to a rear roof rail 66 by a second multi-link hinge assembly (MHA) 68. Second MHA 68 includes a pivot connection 70 between an intermediate or middle portion of center roof rail 46 and an end of a third link 72. An opposite end of third link 72 is pivotally connected to a front end portion of rear roof rail 66 at pivot 74. One end of a fourth link 76 is pivotally connected to a rear end portion of center roof rail 46 at pivot 78 while an opposite end of fourth link 76 is pivotally connected to an intermediate or middle portion of rear roof rail 66 at pivot 80. Thus, second MHA 68 is a four-bar linkage assembly that includes center roof rail 46, third link 72, rear roof rail 66, and fourth link 76 and is defined by pivots 70, 74, 80, and 78. Second MHA 68 controls rotation of center roof rail 46 relative to rear roof rail 66. As can be seen, center roof rail 46 is not directly connected to rear roof rail 66. In other words, center roof rail 46 and rear roof rail 66 are connected together only by intermediary links, such as third and fourth links 72 and 76, as shown in the preferred embodiment.

Second MHA 68 also controls operation of first MHA 48 via first control link 62. As stated above, the front end portion of first control link 62 is pivotally connected to first MHA 48 at pivot 64. A back end portion of first control link 62 is pivotally connected to second MHA 68 and, more specifically, to an intermediate or middle portion of third link 72 at pivot 82. When second MHA 68 moves, first control link 62 moves which in turn causes first MHA 48 to also move. Thus, not only does movement of second MHA 68 control rotation of center roof rail 46 relative to rear roof rail 66, it also controls movement of first MHA 48, via first control link 62, which in turn controls rotation of front roof rail 44 relative to center roof rail 46.

The coupling of first and second MHAs 48 and 68 via first control link 62 also forms a four-bar linkage assembly 83. Four-bar linkage assembly 83 includes center roof rail 46, second link 56, first control link 62, and third link 72 and is defined by pivots 60, 64, 82, and 70. four-bar linkage assembly 83 helps guide rotation of center roof rail 46 relative to rear roof rail 66. Specifically, four-bar linkage assembly 83 helps guide movement of a front end portion and an intermediate or middle portion of center roof rail 46. Four-bar linkage assembly 83 shares a common link with both first MHA 48 and second MHA 68. Specifically, four-bar linkage assembly 83 shares second link 56 with first MHA 48 and shares third link 72 with second MHA 68.

A back end portion of rear roof rail 66 is pivotally connected to vehicle 22 at pivot 84. A first end of a balance link 86 is pivotally connected to vehicle 22 at pivot 88 while an opposite end is pivotally connected to second MHA 68 and, specifically, to an intermediate or middle portion of fourth link 76 at pivot 90. Movement of rear roof rail 66 relative to vehicle 22 about pivot 84 is controlled by a powered driving element or actuator 92. Powered actuator 92 can take a variety of forms, as is known in the art. For example, powered actuator 92 can be an electric motor, a fluid actuated piston, a geared driving element, or a cable, among others. Alternatively, folding mechanism 30 can be manually driven.

A second roof bow 94 is pivotally connected to second link 56 and first control link 62 at pivot 64. Second roof bow 94 is not actively controlled. Rather, second roof bow 94 is attached to roof cover 32 so that movement of roof cover 32 causes second roof bow 94 to pivot relative to second link 56 and first control link 62. A third roof bow 96 is fixedly connected to rear roof rail 66. Alternatively, third roof bow 96 can be formed integrally with rear roof rail 66, in a manner similar to that discussed above in relation to first roof bow 40 and front roof rail 44. Third roof bow 96 is stationary relative to rear roof rail 66. Third roof bow 96 is connected to cover 32 so that when rear roof rail 66 moves, cover 32 moves with the movement of third roof bow 96. A fourth roof bow 98 is pivotally connected to an intermediate or middle portion of rear roof rail 66 at pivot 100. Fourth roof bow 100 is not actively controlled. Rather, fourth roof bow 100 is attached to roof cover 32 so that movement of roof cover 32 causes fourth roof bow 98 to rotate relative to rear roof rail 66 about pivot 100.

Figure 4:
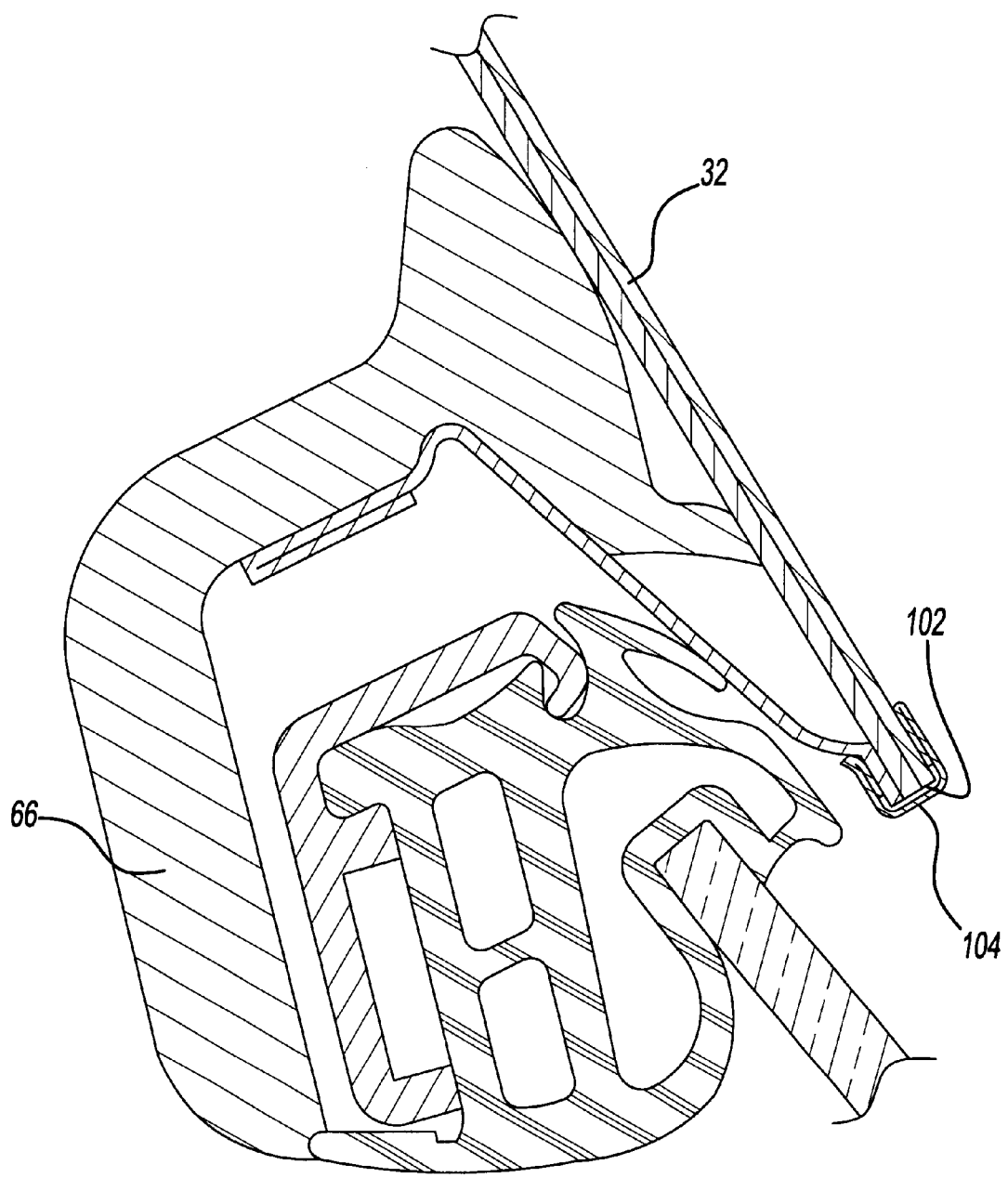
FIG. 4 is a cross-sectional view taken along line 4—4 of FIG. 2A showing attachment of the roof cover to the rear roof rail.

A portion of a peripheral edge 102 of roof cover 32 is secured to roof rails 44, 46 and 66. Attachment of roof cover 32 to roof rails 44, 46 and 66 causes roof cover 102 to move with movement of roof rails 44, 46 and 66 and also provides an aesthetically pleasing appearance. Edge 102 of roof cover 32 can be attached to roof rails 44, 46 and 66 in a variety of ways. For example, as shown in FIG. 4, a portion of edge 102 of roof cover 32 resides in a substantially U-shaped channel 104 in rear roof rail 66. Additionally, other retention devices and/or alternate constructions can be used to secure a portion of edge 102 of roof cover 32 to roof rails 44, 46 and 66.

Figure 2A:
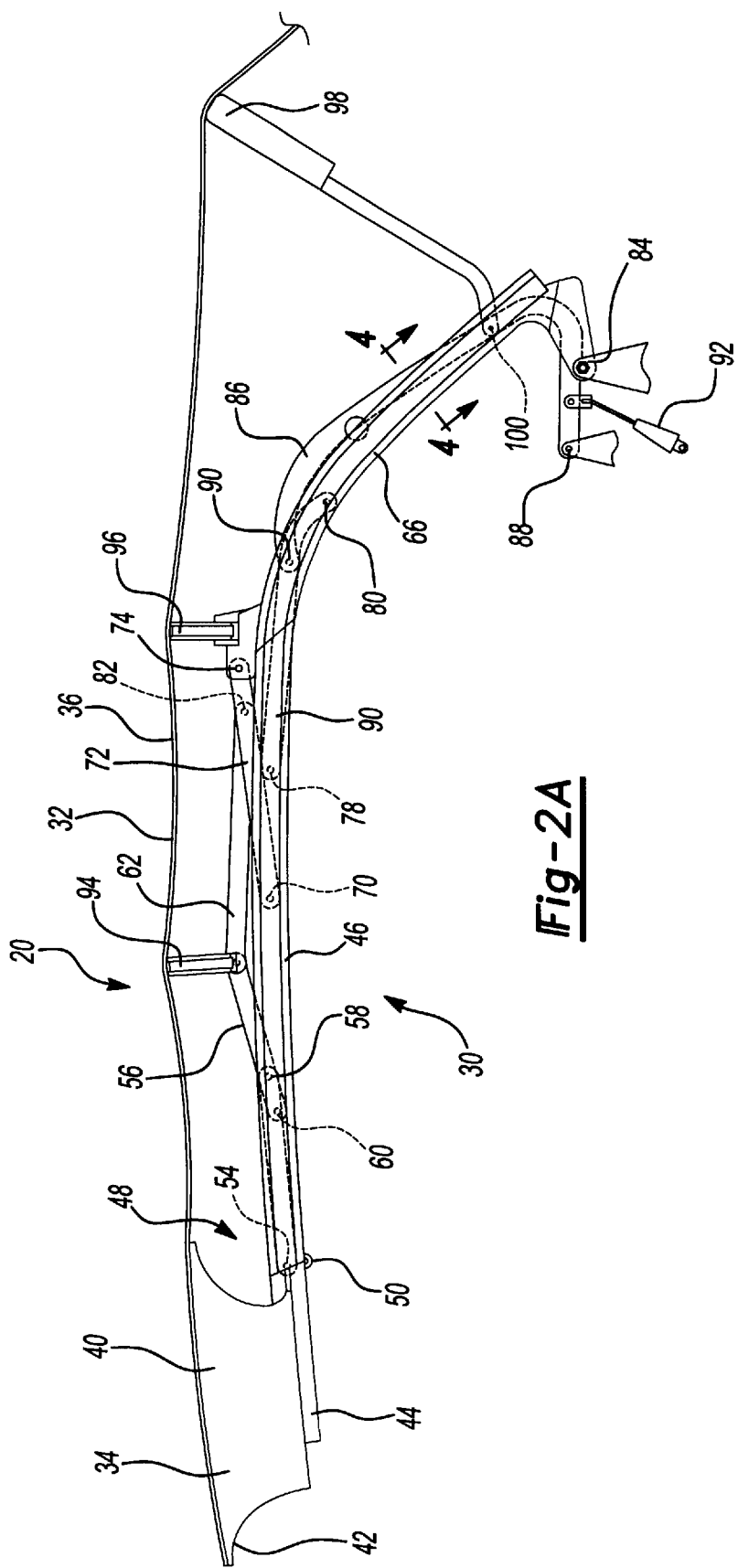
FIG. 2A is a side elevation view showing the left half of the preferred embodiment of the convertible roof folding mechanism of the present invention with the folding mechanism in a raised operative position.

Referring now to FIG. 2A, folding mechanism 30 is shown in its fully raised position corresponding to roof cover 32 covering passenger compartment 24 and stowage compartment 26 of vehicle 22. When in the raised position, front roof rail 40, center roof rail 46, and rear roof rail 66 are all generally aligned and first roof bow 40, second roof bow 94, third roof bow 96, and fourth roof bow 98 are fully extended so that roof cover 32 is taut with backlite 38 fully deployed. When convertible roof 20 is to be retracted, first roof bow 40 is unlatched from the front header of vehicle 22, as is known in the art, and powered actuator 92 is operated to cause rear roof rail 66 to rotate about pivot 84 in a clockwise direction when folding mechanism 30 is viewed from the perspective shown in FIGS. 2A–2C.

Figure 2B:
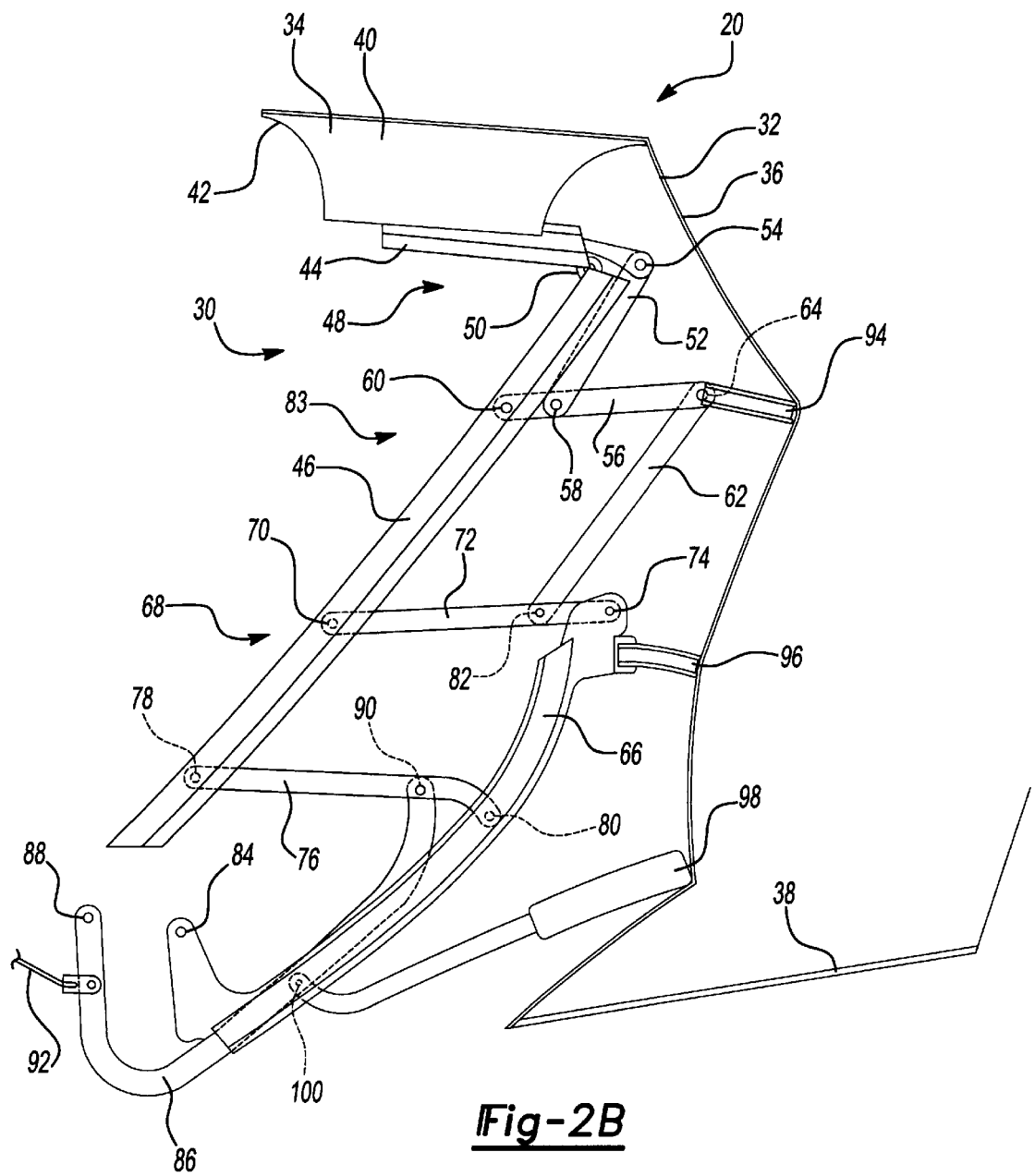
FIG. 2B is a side elevation view showing the left half of the preferred embodiment of the convertible roof folding mechanism of the present invention with the folding mechanism in an intermediary position between the fully raised and stowed positions.

As can be seen in FIG. 2B, as folding mechanism 30 moves from the raised position toward the stowed position, the clockwise rotation of rear roof rail 66 causes third and fourth links 72 and 76 to rotate counterclockwise relative to rear roof rail 66 and open second MHA 68. This in turn causes center roof rail 68 to move rearwardly and rotate clockwise. The rearward movement and clockwise rotation of center roof rail 68 causes center roof rail 68 to generally align with rear roof rail 66 in an overlapping fashion to minimize the packaging requirements of folding mechanism 30. The opening of second MHA 68 causes first control link 62 to move toward first MHA 48. Movement of first control link 62 toward first MHA 48 causes first roof rail 44 to rotate counterclockwise relative to center roof rail 46. The movement of folding mechanism 30 also causes roof cover 32 to relax and begin to fold along with folding mechanism 30. The relaxing of roof cover 32 allows second and fourth roof bows 94 and 98 to rotate relative to folding mechanism 30 about respective pivots 64 and 100 as roof cover 32 folds. Backlite 38 also begins to fold into stowage compartment 26 as roof cover 32 folds.

Figure 2C:
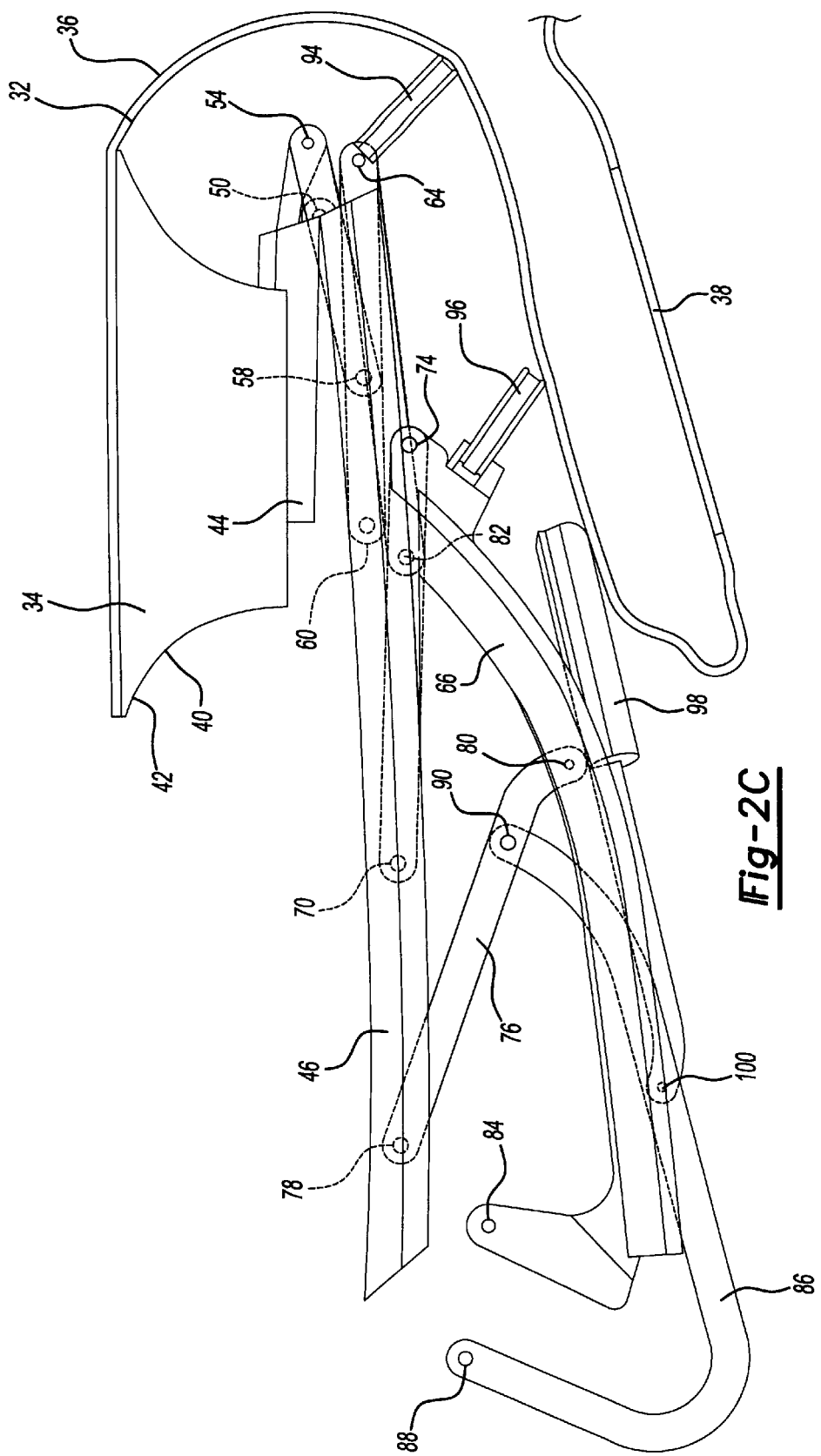
FIG. 2C is a side elevation view showing the left half of the preferred embodiment of the convertible roof folding mechanism of the present invention with the folding mechanism in the stowed position.
Figure 3:
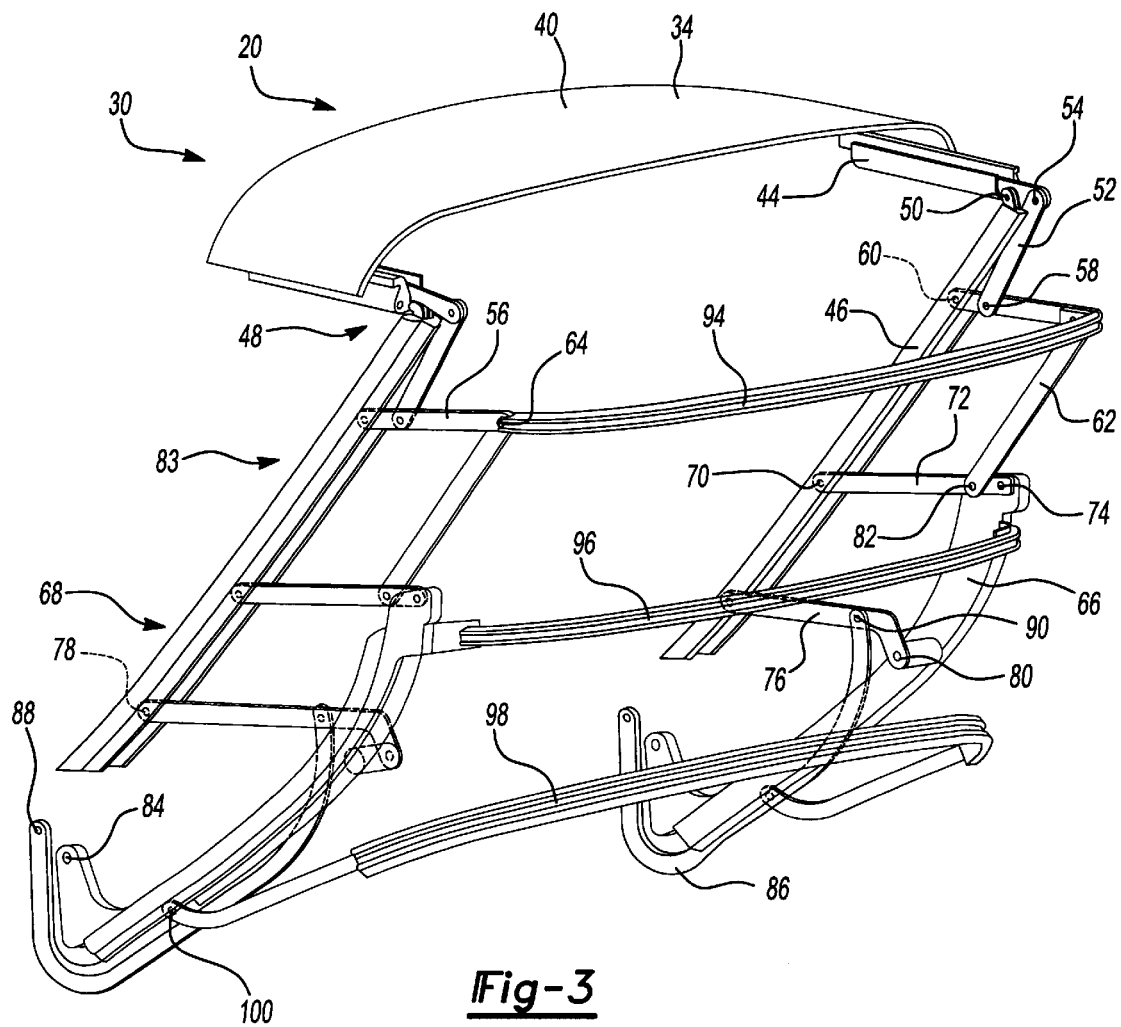
FIG. 3 is a perspective view of the preferred embodiment of the convertible roof folding mechanism of the present invention with the folding mechanism in an intermediary position between the fully raised and stowed positions.

Referring now to FIG. 2C, folding mechanism 30 is shown in its fully stowed position which corresponds to being located in stowage compartment 26. As can be seen, folding mechanism 30 folds and stacks upon itself in an overlapping fashion, in what is known as a reverse tri-fold, with an exterior portion of roof cover 32 and, more specifically, hard portion 34 of roof cover 32 facing upward from stowage compartment 26 in a generally horizontal orientation. Hard portion 34 covers a portion of stowage compartment 26 aft of passenger compartment 24 and becomes essentially the only visible part of convertible roof 20 behind passenger compartment 24 that can be seen when convertible roof 20 is in the stowed position. Hard portion 34 is configured so that a peripheral edge of hard portion 34 matches a shape or contour of a back belt of stowage compartment 26 to conceal and protect a portion of soft portion 36 and a portion of folding mechanism 30 when convertible roof 20 is in the stowed position. The left and right roof linkages of folding mechanism 30 are in quarter trim portions 28 of stowage compartment 26 when convertible roof 20 is in a stowed position. In short, convertible roof 20 of the present invention possess the ability to function as a convertible roof in its raised operative position and to function as an aesthetically attractive and rigid boot or tonneau cover in its stowed position.

When convertible roof 20 is moved from its stowed position to its raised position, folding mechanism 30 operates in a reverse fashion. Powered actuator 92 is operated to cause rear roof rail 66 to rotate counterclockwise about pivot 84. The counterclockwise rotation of rear roof rail 66 causes third and fourth links 72 and 76 of second MHA 68 to rotate clockwise relative to rear roof rail 66 which causes center roof rail 46 to rotate counterclockwise relative to rear roof rail 66. Additionally, the counterclockwise rotation of rear roof rail 66 causes first control link 62 to move second link 56 of first MHA 48 clockwise relative to center roof rail 46 which in turn causes front roof rail 44 to rotate clockwise relative to center roof rail 46 via first MHA 48. The movement of folding mechanism 30 causes roof cover 32 to expand and begin to unfold along with folding mechanism 30. The expanding of roof cover 32 causes second and fourth roof bows 94 and 98 to rotate relative to folding mechanism 30 about respective pivots 64 and 100 as roof cover 32 unfolds. Backlite 38 also begins to move from stowage compartment 26 as roof cover 32 unfolds. When folding mechanism 30 reaches its fully raised position, roof cover 32 is taut and front edge 42 of first roof bow 40 can be latched to the front header of vehicle 22 above the front windshield.

Thus, the present invention provides a convertible roof 20 that includes a folding mechanism 30 that couples two roof rails 46 and 66 together with at least two links 72 and 76 to form at least a four-bar linkage assembly (second MHA 68) without the two roof rails 46 and 66 being directly connected to one another. Additionally, the present invention provides a convertible roof 20 that includes a folding mechanism 30 that folds the convertible roof 20 such that a portion of roof cover 32 conceals a portion of convertible roof 20 within stowage compartment 26.

While various aspects of convertible roof 20 and folding mechanism 30 have been disclosed, it will be appreciated that many other variations may be employed without departing from the scope of the present invention. For example, MHA's 48 and 68 may be more than four-bar linkages. Additionally, the attachment of first control link 62 to first MHA 48 can be at a location other than pivot 64. For example, first control link 62 can be pivotally connected to second link 56 at a different location or pivotally connected to first link 52. Also, second roof bow 94 can be fixedly attached to first control link 62. The exact location of the various pivots of folding mechanism 30 can vary from their locations as shown in the drawings and still be within the scope of the present invention. Furthermore, the specific configurations and orientations of the various linkages and roof rails can have shapes that differ from those shown and still be within the scope of the present invention. Additionally, the roof can be stowed in a rear seating area of the passenger compartment.

The foregoing discussion discloses and describes merely an exemplary embodiment of the present invention. One skilled in the art will readily recognize from such discussion, and from the accompanying drawings and claims, the various changes, modifications and variations can be made therein without departing from the spirit and scope of the invention as defined by the following claims.

What is claimed is:

1. A convertible roof system for an automotive vehicle, the system comprising:
   (a) a roof cover; and
   (b) a folding mechanism supporting at least a portion of said cover, said mechanism being moveable between a stowed position and a raised position, said mechanism comprising:
      (i) a first roof rail, said first roof rail being a rearwardmost roof rail when said mechanism is in said raised position;
      (ii) a second roof rail adjacent said first roof rail; and
      (iii) at least two links coupling said first and second roof rails together to form an at least four-bar and less than a six-bar linkage assembly without said first and second roof rails being directly connected to each other, said linkage assembly controlling motion of said second roof rail relative to said first roof rail when said mechanism moves between said raised and stowed positions.

2. The system of claim 1, wherein said mechanism further comprises a third roof rail pivotally connected to said second roof rail and pivotally coupled to said linkage assembly so that movement of said third roof rail relative to said second roof rail is controlled by said linkage assembly.

3. The system of claim 2, wherein said linkage assembly is a first linkage assembly and said third roof rail is coupled to said first linkage assembly via a second at least four-bar linkage assembly.

4. The system of claim 3, wherein said first and second linkage assemblies share a common link.

5. The system of claim 4, wherein said common link is one of said at least two links.

6. The system of claim 3, further comprising a third link, said third link being pivotally connected to said second linkage assembly and pivotally connected to said third roof rail so that said third roof rail is pivotally coupled to said first linkage assembly via said third link and said second linkage assembly.

7. The system of claim 1, wherein said mechanism further comprises a balance link having a first portion pivoting about an axis and a second portion pivotally connected to said linkage assembly.

8. The system of claim 7, wherein said balance link is pivotally connected to one of said at least two links.

9. The system of claim 1, wherein said mechanism further comprises a roof bow that supports a portion of said cover, and an exterior portion of said cover supported by said roof bow faces upward when said mechanism is in said raised and stowed positions.

10. The system of claim 9, wherein said exterior portion of said cover covers a portion of said mechanism when said mechanism is in said stowed position.

11. The system of claim 1, wherein said linkage assembly is a first linkage assembly and said mechanism further comprises:
   a third roof rail pivotally coupled to said second roof rail by a second at least four-bar linkage assembly, said second linkage assembly controlling movement of said third roof rail relative to said second roof rail, and said second and third roof rails each forming a link of said second linkage assembly; and
   a control link connecting said first and second linkage assemblies together so that movement of said second linkage assembly is controlled by said first linkage assembly.

12. The system of claim 11, wherein said second and third roof rails are pivotally connected together.

13. The system of claim 1, wherein said at least two links are first and second links, said first link is pivotally connected to said first roof rail and pivotally connected to said second roof rail, said second link is pivotally connected to said first roof rail and pivotally connected to said second roof rail, and said linkage assembly is a four-bar linkage assembly.

14. The system of claim 1, wherein said mechanism further comprises an automatically powered actuator connected to said first roof rail, said powered actuator controlling movement of said mechanism between said raised and stowed positions.

15. A convertible roof system for an automotive vehicle, the system comprising:
   a convertible roof top stack mechanism moveable between a stowed position and a raised position, said mechanism comprising:
      (i) a first roof rail, said first roof rail being a rearwardmost roof rail when said mechanism is in said raised position;
      (ii) a second roof rail adjacent said first roof rail;
      (iii) a first linkage assembly coupling said second roof rail to said first roof rail, said first linkage assembly being a four-bar linkage assembly;
      (iv) at least a third roof rail adjacent said second roof rail;
      (v) a second linkage assembly coupling said third roof rail to said second roof rail, said second linkage assembly being at least a four-bar linkage assembly; and
      (vi) a leading roof bow extending transversely relative to said third roof rail, said leading roof bow being forwardmost when fully raised,
   wherein an exterior portion of said roof bow faces upward when said mechanism is in said raised and stowed positions.

16. The system of claim 15, wherein said exterior portion of said roof bow covers a portion of said mechanism when said mechanism is in said stowed position.

17. The system of claim 15, wherein said second linkage assembly is a four-bar linkage assembly.

18. The system of claim 15, wherein said first roof rail is not directly connected to said second roof rail.

19. The system of claim 15, wherein said mechanism further comprises an automatically powered actuator operable to move said mechanism between said raised and stowed positions.

20. The system of claim 15, wherein said third roof rail is directly pivotally connected to said second roof rail.

21. The system of claim 15, wherein said mechanism further comprises a control link that couples said first and second linkage assemblies together so that movement of said second linkage assembly is controlled by said first linkage assembly.

22. A convertible roof system for an automotive vehicle, said system comprising:
(a) a roof cover; and
(b) a folding mechanism supporting at least a portion of said cover, said mechanism being moveable between a stowed position and a raised position, said mechanism comprising:
　(i) a first roof rail, said first roof rail being a rearward-most roof rail when said mechanism is in said raised position;
　(ii) a second roof rail pivotally coupled to said first roof rail;
　(iii) a third roof rail pivotally coupled to said second roof rail;
　(iv) a first at least four-bar linkage assembly coupling said second roof rail to said first roof rail;
　(v) a second at least four-bar linkage assembly coupling said third roof rail to said second roof rail; and
　(vi) a third at least four-bar linkage assembly coupling said first linkage assembly to said second linkage assembly.

23. The system of claim 22, wherein said mechanism further comprises a roof bow that supports a portion of said cover, and an exterior portion of said cover supported by said roof bow faces upward when said mechanism is in said raised and stowed positions.

24. The system of claim 23, wherein said exterior portion of said cover covers a portion of said mechanism when said mechanism is in said stowed position.

25. The system of claim 22, wherein said first linkage assembly and said third linkage assembly share a common link.

26. The system of claim 25, wherein said common link is a first common link and said second linkage assembly and said third linkage assembly share a second common link.

27. The system of claim 22, wherein said second linkage assembly and said third linkage assembly share a common link.

28. The system of claim 22, wherein said first roof rail is not directly connected to said second roof rail.

29. The system of claim 22, wherein said second roof rail is a link in each of said first, second, and third linkage assemblies.

30. The system of claim 22, wherein each linkage assembly is a four-bar linkage assembly.

31. The system of claim 22, wherein said mechanism further comprises an automatically powered actuator operable to cause said mechanism to move between said raised and stowed positions.

32. A convertible roof system for an automotive vehicle, the system comprising:
a folding mechanism supporting at least a portion of said cover, said mechanism being moveable between a stowed position and a raised position, said mechanism comprising:
　(a) a first roof rail, said first roof rail being a rearward-most roof rail when said mechanism is in said raised position;
　(b) a second roof rail adjacent said first roof rail; and
　(c) at least a third roof rail adjacent to said second roof rail, and
wherein said first roof rail is pivotally coupled to a middle portion of said second roof rail at a first location and said third roof rail is pivotally coupled to said middle portion of said second roof rail at a second location different than said first location.

33. The system of claim 32, wherein said mechanism further comprises a roof bow having an exterior that faces upward when said mechanism is in said raised and stowed positions.

34. The system of claim 32, wherein a link coupling said first roof rail to said middle portion of said second roof rail is part of an at least four-bar linkage assembly.

\* \* \* \* \*